United States Patent Office 2,980,649
Patented Apr. 18, 1961

2,980,649

FUSIBLE BUT INSOLUBLE HIGH-MELTING, FIBER-FORMING POLYESTERS

John R. Caldwell and Russell Gilkey, Kingsport, Tenn., assignors to Eastman Kodak Company, Rochester, N.Y., a corporation of New Jersey No Drawing. Filed Aug. 23, 1956, Ser. No. 605,693

14 Claims. (Cl. 260—47)

This invention relates primarily to highly polymeric, high melting, cross-linked, fiber-forming polyesters derived from an aromatic (or hydrogenated aromatic) bifunctional dicarboxy compound (e.g. dimethyl terephthalate) condensed with a glycol (e.g. ethylene glycol or 1,4-cyclohexane dimethanol) which have been prepared in such a manner as to be substantially insoluble in organic solvents and possess improved resistance to heat distortion while at the same time retaining fusibility at some temperatures within the range between about 150° and 350° C. These improved cross-linked polyesters are prepared by following a process known to produce a linear, highly polymeric, high-melting polyester by condensing a bifunctional hexacarbocyclic carboxy compound with a bifunctional glycol employing as the glycol at least 10 mole percent of an aliphatic unsaturated bifunctional glycol containing an ethylenically unsaturated bond, then incorporating into this linear polyester an organic peroxy compound, and heating to at least about 50° C. until the desired cross-linked polyester is produced.

The preparation of infusible non-crystalline polyesters involving the cross-linking or vulcanization of such compositions containing unsaturated aliphatic acids is exemplified by U.S. patent 2,410,073 and is described in the literature such as in Ind. Eng. Chem. 39, 1090 (1947). For example, polyesters containing maleic acid can be cross-linked by heating with benzoyl peroxide. None of these polyesters can be formed into fibers or films which can be drafted, heat-set and used in making fabrics, photographic film, or other articles requiring a high-melting, stable, fusible polymer.

Although it is also known that olefinic glycols such as 1,4-butenediol can be employed in polyesters, there is no contemplation of using them in high melting crystalline fiber-forming polyesters.

The use of unsaturated glycols in the preparation of polycarbonates including modifications employing saturated polybasic acids such as oxalic, malonic, citric, etc. is described in U.S. 2,563,771 which discusses the polymerization of such materials employing various organic and inorganic peroxy compounds; this patent illustrates the fact that the unsaturated diols have been generally considered to be of no use in the preparation of those high melting, fiber-forming polyesters to which the present invention pertains.

In polyesters that contain unsaturated acids such as maleic acid, the double bond is activated by conjugation with the carbonyl groups. It is well known that such conjugated double bonds are highly reactive toward addition and oxidation reactions. Thus, alkyd resins containing maleic acid and other related unsaturated acids can be readily cross-linked to form infusible and insoluble products which are of value as protective coatings such as in paints, varnishes, and the like.

We have now made the unexpected discovery that the non-conjugated unsaturated bifunctional glycols (which do not contain a double bond conjugated with an activating group) can be employed in the preparation of the recently developed linear highly polymeric, high-melting polyesters derived by condensing a hexacarbocyclic bifunctional carboxy compound and a bifunctional glycol, e.g. polyethylene terephthalate, etc. Although it would have been expected that the employment of such unsaturated glycols in the preparation of these fiber-forming fusible high-melting polyesters would be detrimental, we have discovered that their presence in such a polyester appears to activate the non-conjugated unsaturation in the glycol to an extent which permits some degree of cross-linking when the polyesters are treated with an organic peroxy compound of the general type capable of cross-linking the unsaturated bonds in the infusible polyesters derived from unsaturated bifunctional aliphatic acids such as maleic acid. This moderated cross-linking can be readily accomplished by heating at an elevated temperature such as about 50° C. up to a maximum temperature preferably below the melting point of the linear polyester being cross-linked. Most unexpectedly, the cross-linking which is accomplished does not render the polyester infusible nor does it substantially affect the melting point of the polyester. Quite surprisingly, the moderated cross-linking results in the formation of a polyester which has greater insolubility in organic solvents and improved resistance to heat distortion.

Thus, by practicing this invention, the usual highly polymeric, high-melting, fusible, fiber-forming polyesters can be produced which have essentially the same valuable characteristics normally attributed to such polyesters with the added features of greater insolubility and improved resistance to heat distortion. As a consequence, the polyesters produced according to this invention can be employed in the preparation of synthetic fibers and films which can be subjected to conditions under which the previously known films and fibers (such as those produced from polyethylene terephthalate) could not be effectively employed.

It is an object of this invention to provide highly polymeric, high-melting, fusible, cross-linked, fiber-forming polyesters derived from a hexacarbocyclic bifunctional dicarboxy compound and a bifunctional glycol which are substantially insoluble in most organic solvents and possess improved resistance to heat distortion while retaining a fusibility at some temperature range between about 150° C. and 350° C. and retaining essentially all of the other valuable attributes of the previously known polyesters of this type.

It is a further object of this invention to provide a process for preparing such improved polyesters.

An additional object of this invention is to provide fibers and films prepared from these improved polyesters.

Other objects of this invention will become apparent herein.

In accordance with one embodiment of this invention there is provided a process for preparing a highly polymeric, high-melting, cross-linked, fusible, fiber-forming polyester from a hexacarbocyclic bifunctional dicarboxy compound condensed wth a glycol in accordance with the usual processes for preparing such polyesters and modifications thereof which have melting points between about 150° and 350° C., with the exception that the usual bifunctional glycol containing from 2 to about 12 carbon atoms which is normally employed in the preparation of such a polyester is replaced with from about 10 to about 100 mole percent (based on the weight of glycol employed) of an aliphatic non-conjugated unsaturated bifunctional glycol having from 2 to 12 carbon atoms, that is, a glycol containing at least one ethylenically unsaturated bond between the carbon atoms which connect the two glycolic oxy atoms. The term "non-conjugated" excludes the presence of conjugated bonds as illustrated by the formula:

HO—CH=CH—CH=CH—OH

This modified process for preparing a substantially linear polyester is then followed by the steps of incorporating a cross-linking agent into the linear polyester and then heating the linear polyester at from about 50° C. up to a temperature preferably below the melting point of the linear polyester for from about 5 minutes to about 5 hours whereby a cross-linked, fiber-forming, fusible, polyester is produced.

Quite a number of patents have been issued during the last few years describing processes for preparing highly polymeric, high-melting, fusible, fiber-forming linear polyesters derived from a dicarboxy compound condensed with a glycol. Perhaps the best known of this group of recently developed polyesters is polyethylene terephthalate. Other aromatic bifunctional dicarboxy compounds which can be advantageously employed in preparing such polyesters include those containing carboxy groups directly attached to an aromatic ring which are situated in a para relationship such as 4,4'-sulfonyldizenzoic acid, p,p'-diphenic acid, 1,2-di(p-carboxyphenyl) ethane, 1,2-di(p-carboxyphenoxy) ethane, chlorinated terephthalic acid, etc. It has recently become apparent that an equivalent acid is the fully hydrogenated derivative of terephthalic acid, especially the trans-isomer of 1,4-cyclohexanedicarboxylic acid which appears to function in many regards as an equivalent of terephthalic acid. The compounds of this class can be generically referred to as hexacarbocyclic bifunctional dicarboxy compounds wherein the carboxy substituents are nuclearly located in a para relationship.

The prior art shows that the polyesters derived from such hexacarbocyclic dicarboxylic acids, esters, and related compounds have melting points which are generally well above 150° C. and that such polyesters can be modified by incorporating aliphatic bifunctional dicarboxy compounds into the process for their preparation so as to improve various physical and chemical characteristics without adversely affecting the most valuable characteristics contributed by the aromatic (or hydrogenated aromatic) bifunctional dicarboxylic compounds. Moreover, meta and ortho positioned aromatic dicarboxy compounds can also be used as modifiers. Examples of modifying dicarboxylic acids include glutaric acid, dimethylmalonic acid, succinic acid, adipic acid, 2-methyladipic acid, p-carboxycarbanilic acid, isophthalic acid, suberic acid, azelaic acid, sebacic acid, pimelic acid, brassic acid, brassylic acid, roccellic acid, etc.

The high-melting, highly polymeric, modified or unmodified fusible, fiber-forming polyesters of the prior art have generally been produced by the employment of an aliphatic saturated bifunctional glycol containing from 2 to 12 carbon atoms such as ethylene glycol, tetramethylene glycol, decamethylene glycol, 2,2-dimethylpropanediol-1,3,3-methylhexanediol-1,6 diethylene glycol, triethylene glycol, etc. Other branched chain glycols, cyclic glycols, ether glycols, etc. can be employed as modifiers. An especially useful glycol is 1,4-cyclohexanedimethanol (cis or trans isomer). Trans-quinitol can also be employed.

One of the essential features of this invention lies in the employment of a non-conjugated unsaturated glycol which differs from those ordinarily employed in those respects mentioned above. Such a glycol contains an olefinically unsaturated bond in the group of connected carbon atoms attached to a glycolic oxygen atom. Examples of these unsaturated glycols include 2-butene-1,4-diol, 2-pentene-1,5-diol, 3-hexene-1,6-diol, 2-hexene-1,5-diol, 3-octene-1,8-diol, 2-butene-2-methyl-1,4-diol, 2-hexene-2-ethyl-1,6-diol, etc. Likewise, the unsaturated glycols which can be employed in accordance with this invention include those which are analogous to the ether glycols previously known to be useful, for example:

HO—CH$_2$—CH=CH—CH$_2$—O—CH$_2$—CH$_2$—OH

HO—CH$_2$—CH=CH$_2$—O—CH$_2$—CH=CH—CH$_2$—OH, etc.

These non-conjugated unsaturated glycols which can be employed in accordance with this invention contain the group —CH=CR— wherein R represents a hydrogen, methyl, ethyl or other lower alkyl radical containing from 1 to 4 carbon atoms.

Glycols containing an olefinic ring structure also can be used. Typical examples include:

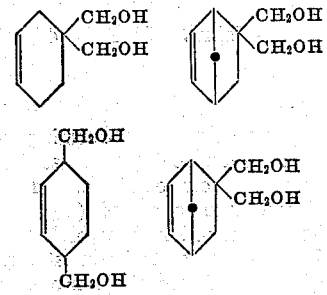

etc., wherein the compounds illustrated are derivatives of cyclohexene and bicyclo (2.2.1) heptene; of course, other related cyclic olefinic glycols can be similarly employed.

Any of the glycols or dicarboxy compounds employed in accordance with this invention can contain other substituents which are nonfunctional and do not enter into the polyesterification reaction such as chlorine substituents, nitro substituents, alkoxy substituents, thioether groups, etc. The use of compounds of such classes is described in the prior art.

In preparing the polyesters employing the non-conjugated unsaturated glycols in accordance with this invention, the principles relating to the preparation of the related polyesters using the saturated glycols apply in an analogous manner. For example, the presence of unsymmetrical branched chains or ether linkages tends to reduce the melting points as well as reduce the crystallinity of the polyesters produced. The techniques during the first part of the production of the polyesters of this invention are the same as those employed in the preparation of those known linear polyesters wherein a saturated glycol is employed. This is generally accomplished by an ester interchange reaction employing an excess of the glycol and a lower alkyl ester of the bifunctional dicarboxy compound using an ester interchange polyesterification catalyst. The polyesterification process can be performed using the melt-polymerization procedure or the solid-phase polymerization procedure. After this substantially linear polyester has been prepared employing at least 10 mole percent of the non-conjugated unsaturated glycol, a cross-linking agent is incorporated into the polyester.

The cross-linking agents most advantageously employed are organic peroxides such as benzoyl peroxide, acetyl peroxide, lauryl peroxide, dibutyryl peroxide, tertiarybutyl hydroperoxide, peracetic acid, perphthalic acid, benzoyl acetyl peroxide, tertiarybutyl peracetate, cumene hydroperoxide, etc. It is generally advantageous to employ from about 1% to about 15% by weight of the polyester of the organic peroxide cross-linking agent although higher or lower percentages can also be employed. From about 4% to about 8% of the peroxide is most advantageously used. Under some circumstances, the inorganic peroxides can be employed, however, it is generally most advantageous to employ the organic peroxides.

Examples of ways in which the peroxide can be advantageously incorporated in the polyester include milling operations, rolling operations, dissolving the peroxide and the polyester in a mutual solvent and evaporating the solvent, treating the polyester with a swelling agent and then treating the swollen polyester with a solution of a peroxide which penetrates into the swollen polyester, spraying a solution of the peroxide upon granules of the polyester, mixing the peroxide in powder form with granules of the polyester, introducing the peroxide into the molten polyester during the last stages of the preparation of the polyester by the usual melt-polymerization technique etc.

After the organic peroxy compound has been incorporated into the linear polyester, the final product is produced by heating the polyester at from about 50° C. up to a maximum temperature of about 300° C. Most advantageously the maximum temperaturve is limited to a temperature just below the melting point of the substantially linear polyester which is being cross-linked. The heating at an elevated temperature is maintained from about 5 minutes to 5 hours depending upon the temperature and the degree of cross-linking desired. It is most advantageous to heat at a temperature of from about 100° C. to about 160° C. for from about 10 minutes to about 3 hours. Of course, higher temperatures increase the rapidity of the cross-linking thereby reducing the time to a matter of just a few minutes.

When the peroxy compound is introduced onto the surface of granules of the polyester and the polyester is then extruded in the customary manner, the extrusion process provides both a mixing operation for the incorporation of the peroxy compound into the polyester as well as a sufficiently elevated temperature which is required to produce a cross-linking of the polyester.

As mentioned above, the peroxy compound may be incorporated into the polyester by milling or rolling if the polyester has a sufficiently low softening point which permits the milling or rolling operation to be performed within the usually advantageous temperature range of around 100° C. such as from 80° to about 110° C.

One of the processes for incorporating the peroxide includes dissolving the substantially linear polyester in a suitable solvent so as to form a dope or solution of the linear polyester and then adding the peroxy compound to the solution. Films can then be cast from this solution and the solvent evaporated to give a uniform dispersion of the peroxy compound in the polyester. The evaporating of the solvent can be performed so as to simultaneously heat treat the polyester thereby accomplishing the cross-linking. Alternatively, the evaporation can be performed first and the cross-linking can then be performed at any subsequent time as desired.

The substantially linear polyester can be granulated or pulverized to a particle size of 100 mesh or finer and the powder then mixed with a peroxy compound in a volatile solvent after which the solvent can be evaporated. This powder can be molded or extruded by the usual methods which generally provide adequate heat treatment sufficient to cross-link the polyester or additional heat treatment can be performed after the molding or extruding operation.

Films or fibers of the substantially linear polyester can be soaked in a solution of the peroxide using a liquid which is a swelling agent for the polyester. This treatment allows the peroxide to diffuse into the polyester. The treated films or fibers can then be heat treated at an elevated temperature in order to accomplish the cross-linking.

It is evident that the cross-linked polyesters produced in accordance with this invention can be employed as films, fibers, coating compositions, molding compositions, and the like. These products are essentially analogous to those produced from those linear polyesters prepared by using a saturated glycol but have the added advantages of improved resistance to heat distortion and reduced solubility in organic solvents such as dichloromethane, tetrachloroethane, cresol, etc.

The polyesters of this invention can be employed in the manufacture of photographic film supports for light-sensitive silver halide gelatin emulsions of either the color or black-and-white types as well as for the preparation of fibers, yarns, textile fabrics and the like and for other purposes as indicated above. The textile fabrics produced are less susceptible to damage during ironing and pressing. The photographic film which can be produced is less susceptible to heat distortion during use in movie projectors, slide projectors or the like.

This invention can be further illustrated by the following examples of preferred embodiments although it will be understood that these examples are included merely for purposes of illustration and are not intended to limit the scope of the invention unless otherwise specifically indicated.

*Example 1*

Four hundred and twenty grams (1.0 mole) of 4,4'-sulfonyldibenzoic acid dibutyl ester, 216 g. (1.0 mole) of dimethylazelate, 208 g. (2.0 moles) of pentamethylene glycol, and 176 g. (2.0 moles) of 2-butene-1,4-diol were placed in a reaction vessel equipped with a stirrer, a distillation column, and an inlet for purified nitrogen. A solution of 0.2 g. sodium titanium butoxide in 5 cc. of butyl alcohol was added as polymerization catalyst.

The mixture was stirred at 200–210° C. in an atmosphere of nitrogen, and a mixture of butyl and methyl alcohol was distilled from the vessel. When evolution of alcohol had practically stopped, the temperature was raised to 240° C. and stirring was continued for 20 minutes. A vacuum of 0.1 mm. was then applied and stirring was continued for 2 hours. The product was somewhat rubbery and light tan in color. It had an inherent viscosity, as measured in 60 phenol-40 tetrachloroethane, of 1.2.

A dope of this substantially linear polyester in dichloromethane was prepared containing 5% by weight of benzoyl peroxide based on the polymer. Films were coated from the dope, and after evaporation of the solvent, they were cured at 110° C. for 2 hours. These films were still somewhat rubbery but very tough. They were no longer soluble in dichloromethane. They are useful as a protective coating having excellent resistance to practically all organic solvents.

*Example 2*

A copolyester was made having the composition 0.4 mole 4,4'-sulfonyldibenzoic acid + 0.6 mole 2-methyladipic acid + 0.4 mole hexamethylene glycol + 0.6 mole 3-hexene-1,6-diol. One hundred grams of the polyester and 5 g. of cumene hydroperoxide were dissolved in 600 cc. of 1,2-dichloroethane and films were coated from the solution. After drying, the films were heated for 1 hour at 130° C. The films were insoluble in the usual polyester solvents, but still retained their flexibility. They also had greater tear resistance than the original substantially linear polyester.

*Example 3*

A copolyester was made having the composition 0.3 mole 4,4'-sulfonyldibenzoic acid + 0.7 mole sebacic acid + 0.6 mole tetramethylene glycol + 0.4 mole 2-butene-1,4-diol. Twenty-four grams of di-tert-butyl peroxide was milled into 300 g. of the polyester on rubber rolls at 100° C. The milled product was pressed into sheets and cured at 150° C. for 30 minutes. The cross-linked material was insoluble and very tough. It is valuable in the production of molded articles.

*Example 4*

A polyester was made having the composition 0.7 mole 4,4'-sulfonyldibenzoic acid + 0.3 mole adipic acid + 1.0 mole 2-hexene-2-ethyl-1,6-diol. This polymer was granulated to a particle size 0.005 inch and 100 parts were slurried with 7 parts of lauroyl peroxide dissolved in methanol. The methanol was evaporated so that the polyester particles were coated with the peroxide. The powder was then compression molded to give a cross-linked polymer. Molded articles obtained possessed good physical properties, especially a high heat distortion temperature.

*Example 5*

A polyester was made having the composition 1.0 mole terephthalic acid + 0.8 mole butanediol + 0.2 mole 2-butene-1,4-diol. This polymer was extruded in the usual manner to give film. The film was soaked in a 1,1,2-trichloroethane solution containing tert-butyl peracetate of such concentration that the dried film contained 4% by weight of the peroxide. The peroxide was fairly well dispersed in the film due to the action of the swelling agent. The film was processed in the usual way by stretching and was then heated at 140° C. for 15 minutes. These films possessed a higher heat distortion temperature and modulus of elasticity than do films produced from polyethylene terephthalate.

*Example 6*

A polyester having the composition 1.0 mole 1,2-di(p-carboxyphenoxy) ethane + 0.8 mole ethylene glycol + 0.2 mole 2-butene-1,4-diol was extruded into fiber. Four percent by weight of di-tert-butyl peroxide was deposited in the fiber by soaking the fiber in a dichloromethane solution of the peroxide. The dried fiber was drafted and then heated at 140° C. for 20 minutes. The 2-butene-1,4-diol portion of the polymer was thus cross-linked. This results in a higher sticking temperature for the fiber.

*Example 7*

A polyester was produced as in Example 5 except that the butanediol was replaced with a 50–50 mixture of cis and trans isomers of 1,4-cyclohexanedimethanol. This polymer was extruded by melt-spinning to form fibers which were treated with peroxide and processed as described in Example 5. The fibers produced had a softening point above 250° C. and were of improved resistance to heat distortion. They were woven into useful fabrics which were not adversely affected by most organic solvents.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing a highly polymeric, cross-linked, fiber-forming polyester comprising (A) incorporating an organic peroxy compound in an amount of from about 1% to about 15% by weight of the polyester into a substantially linear polyester of reactants consisting of (I) a dicarboxylic acid composed of 30 to 100 mole percent of a hexacarbocyclic dicarboxylic acid selected from the group consisting of terephthalic acid, 4,4'-sulfonyldibenzoic acid, 1,4-cyclohexanedicarboxylic acid, 1,2-di(p-carboxyphenoxy)ethane, 1,2-di(p-carboxyphenyl)ethane, and p,p'-diphenic acid and from 0 to 70 mole percent of a dicarboxylic acid selected from the group consisting of isophthalic acid, p-carboxycarbanilic acid and a saturated aliphatic dicarboxylic acid containing from 2 to 20 carbon atoms and (II) a dihydroxy compound composed of from 10 to 100 mole percent of an aliphatic nonconjugated unsaturated glycol containing an ethylenically unsaturated bond in the group of interconnected carbon atoms attached to a glycolic oxy atom and from 0 to 90 mole percent of a saturated aliphatic glycol containing from 2 to 12 carbon atoms, and (B) heating at from about 50° C. up to the melting point of the substantially linear polyester whereby there is produced a cross-linked polyester which is substantially insoluble in organic solvents, possesses improved resistance to heat distortion and is fusible at temperatures within the range between about 150° C. and 300° C.

2. A process as defined by claim 1 wherein the defined polyester reactants are (I) 4,4'-sulfonyldibenzoic acid and azelaic acid, and (II) 2-butene-1,4-diol and pentamethylene glycol.

3. A process as defined by claim 1 wherein the defined polyester reactants are (I) 4,4'-sulfonyldibenzoic acid and 2-methyladipic acid, and (II) 3-hexene-1,6-diol and hexamethylene glycol.

4. A process as defined by claim 1 wherein the defined polyester reactants are (I) 4,4'-sulfonyldibenzoic acid and sebacic acid and (II) 2-butene-1,4-diol and tetramethylene glycol.

5. A process as defined by claim 1 wherein the defined polyester reactants are (I) terephthalic acid and (II) 2-butene-1,4-diol and butane-1,4-diol.

6. A process as defined by claim 1 wherein the defined polyester reactants are (I) 1,2-di(p-carboxyphenoxy)ethane and (II) 2-butene-1,4-diol and ethylene glycol.

7. A polyester produced by the process defined by claim 1.

8. A polyester produced by the process defined by claim 2.

9. A polyester produced by the process defined by claim 3.

10. A polyester produced by the process defined by claim 4.

11. A polyester produced by the process defined by claim 5.

12. A polyester produced by the process defined by claim 6.

13. A fiber of the polyester produced by the process defined by claim 1.

14. A film of the polyester produced by the process defined by claim 1.

References Cited in the file of this patent

UNITED STATES PATENTS

| | | |
|---|---|---|
| 2,340,109 | D'Alelio | Jan. 25, 1944 |
| 2,388,319 | Fuller | Nov. 6, 1945 |
| 2,431,921 | Cook et al. | Dec. 2, 1947 |
| 2,813,086 | Robitschek et al. | Nov. 12, 1957 |
| 2,863,848 | Robitschek et al. | Dec. 9, 1958 |